United States Patent [19]
Rogers et al.

[11] Patent Number: 5,233,869
[45] Date of Patent: * Aug. 10, 1993

[54] FIRE FIGHTING TRAINER AND APPARATUS INCLUDING A WATER SENSOR

[75] Inventors: William Rogers, Hopatcong; James J. Ernst, Livingston; Steven Williamson, Haledon; Dominick J. Musto, Middlesex, all of N.J.

[73] Assignee: Symtron Systems, Inc., Fair Lawn, N.J.

[*] Notice: The portion of the term of this patent subsequent to Jan. 8, 2008 has been disclaimed.

[21] Appl. No.: 873,965

[22] Filed: Apr. 24, 1992

Related U.S. Application Data

[63] Continuation of Ser. No. 625,210, Dec. 10, 1990, abandoned, which is a continuation-in-part of Ser. No. 387,348, Aug. 9, 1989, Pat. No. 4,983,124, which is a continuation-in-part of Ser. No. 238,453, Aug. 30, 1988, Pat. No. 4,861,270.

[51] Int. Cl.$^5$ .................. G09B 19/00; G01F 23/22
[52] U.S. Cl. .................. 73/294; 73/304 R; 73/DIG. 2; 73/DIG. 5; 434/226; 340/604
[58] Field of Search .................. 73/294, 304 R, 171, 73/DIG. 2, DIG. 5; 340/603, 604; 434/226

[56] References Cited

U.S. PATENT DOCUMENTS

| | | | |
|---|---|---|---|
| 3,675,342 | 7/1972 | Wolf | 434/226 |
| 4,001,949 | 1/1977 | Francis | 434/226 |
| 4,303,396 | 12/1981 | Swiatosz | 434/226 |
| 4,304,132 | 12/1981 | Snaper | 73/304 R |
| 4,520,667 | 6/1985 | Nelson | 73/171 |
| 4,526,548 | 7/1985 | Livingston | 434/226 |
| 4,827,766 | 5/1989 | Nelson | 73/171 |
| 4,903,723 | 2/1990 | Sublett | 340/604 |

*Primary Examiner*—Hezron E. Williams
*Assistant Examiner*—George M. Dombroske
*Attorney, Agent, or Firm*—Richard T. Laughlin

[57] ABSTRACT

A fire fighting trainer for use in training fire fighters is provided. The fire fighting trainer includes a structure having one or more chambers having concrete or grating floors. Each chamber contains one or a series of real or simulated items such as furniture and fixtures and equipment. The trainer has a smoke generating system with an outlet for each chamber. The trainer also includes a propane gas flame generating system. The trainer has a main control panel for regulating the flame generating system and the smoke generating system and for controlling the fire, or fires, and smoke in each chamber. The trainer also has a sensor assembly in each chamber, which senses water.

2 Claims, 12 Drawing Sheets

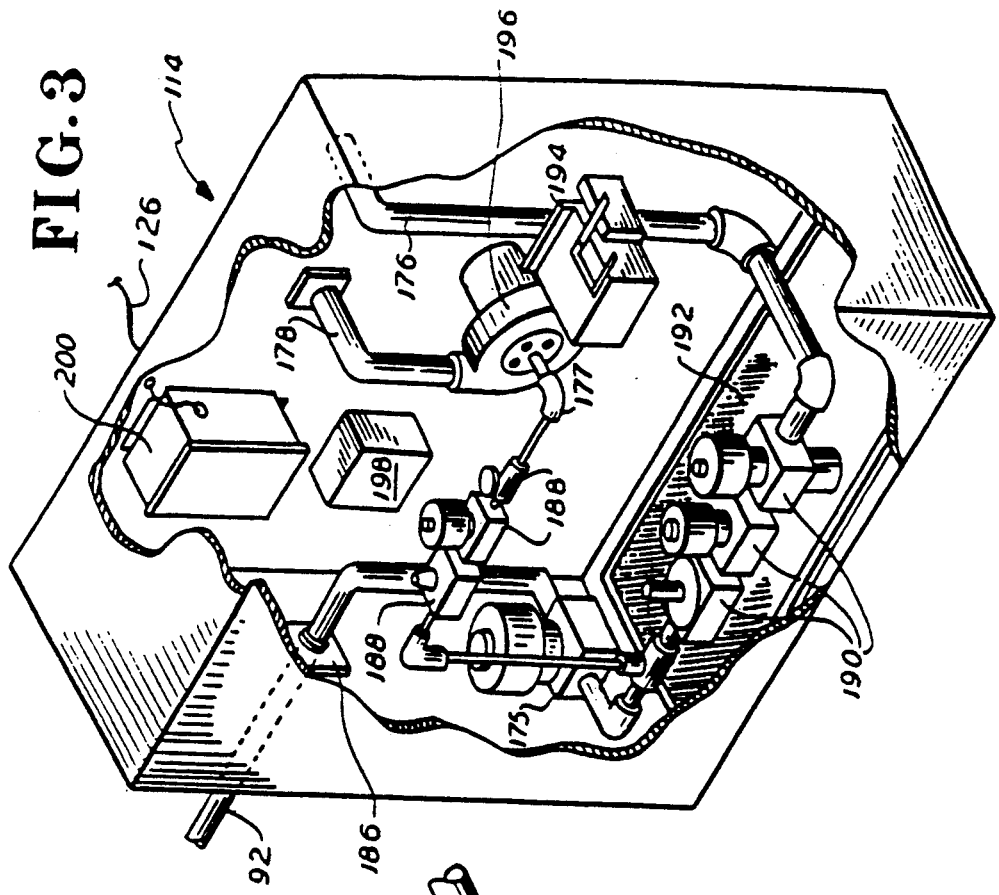
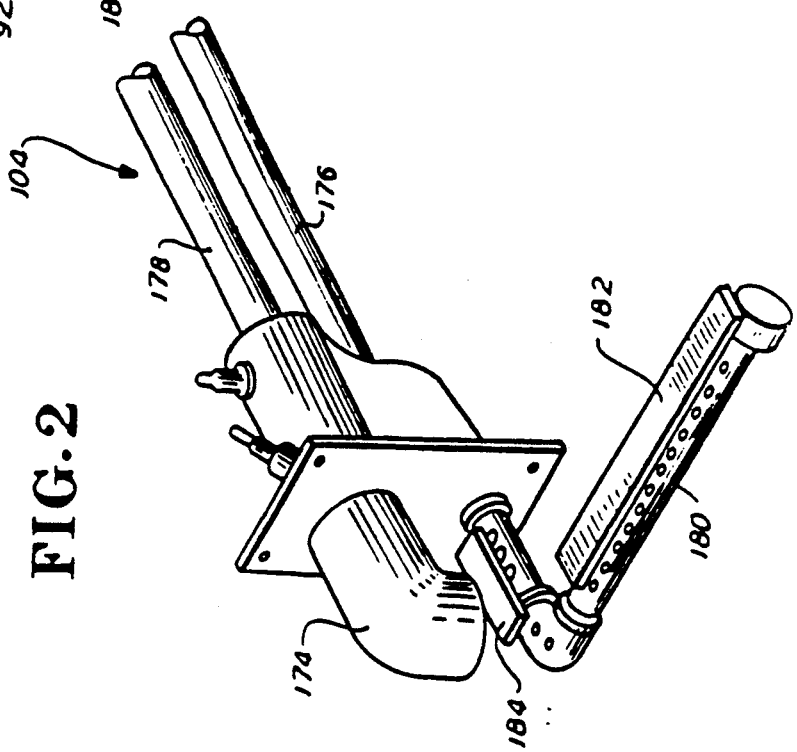

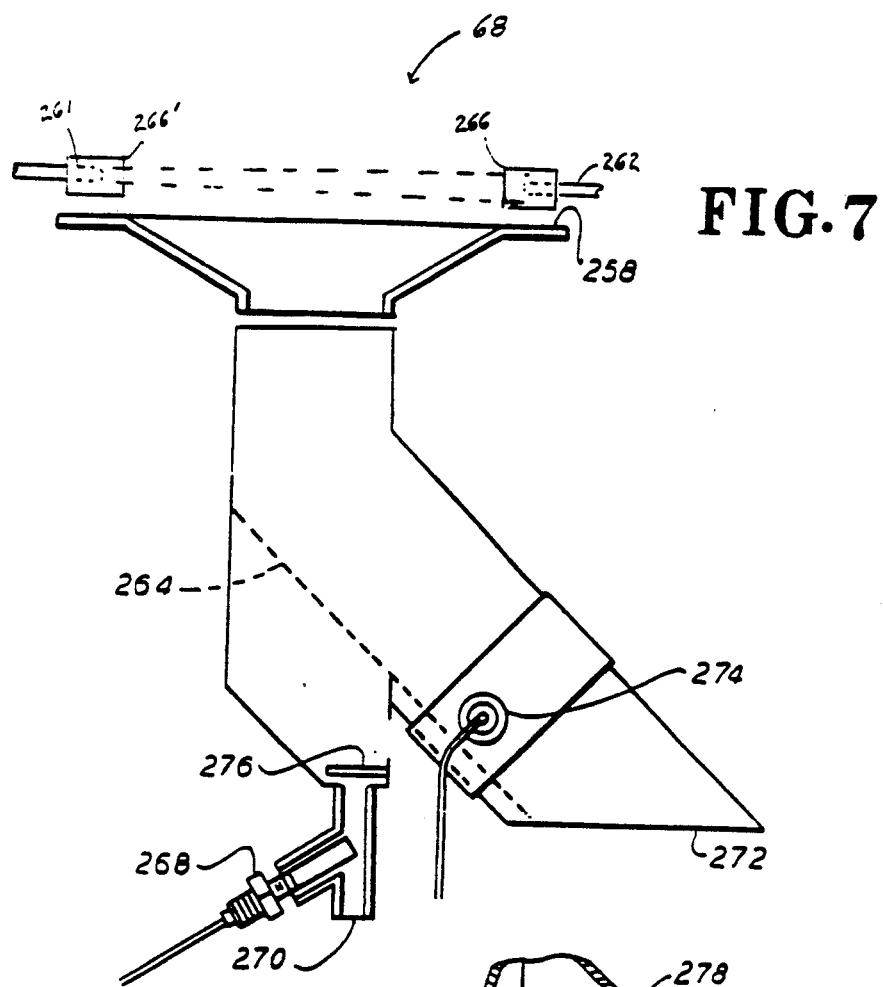
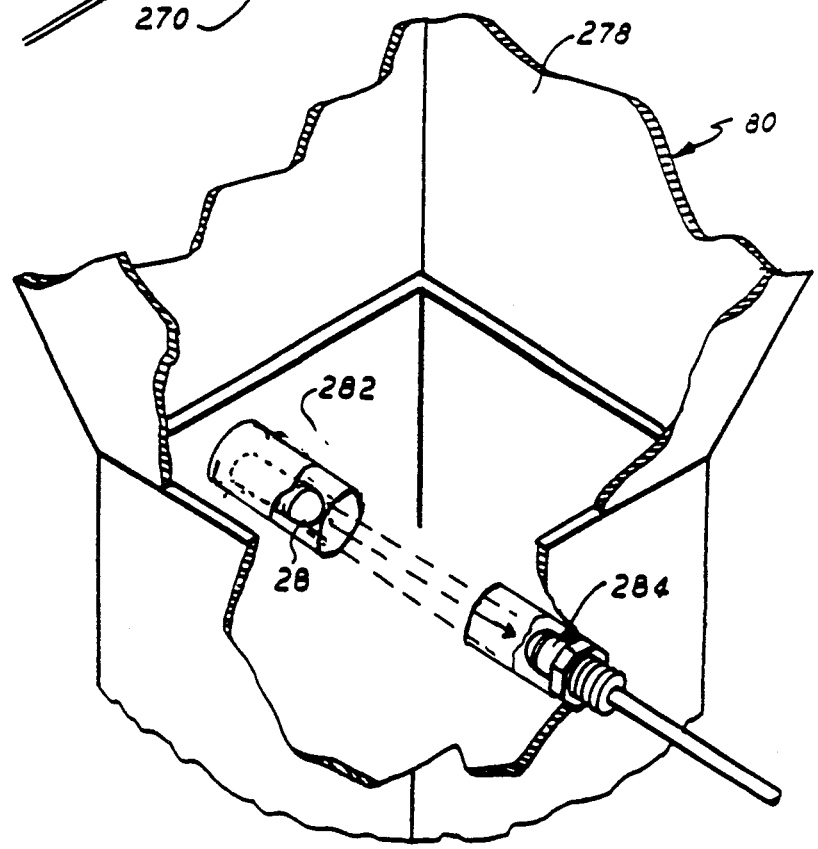

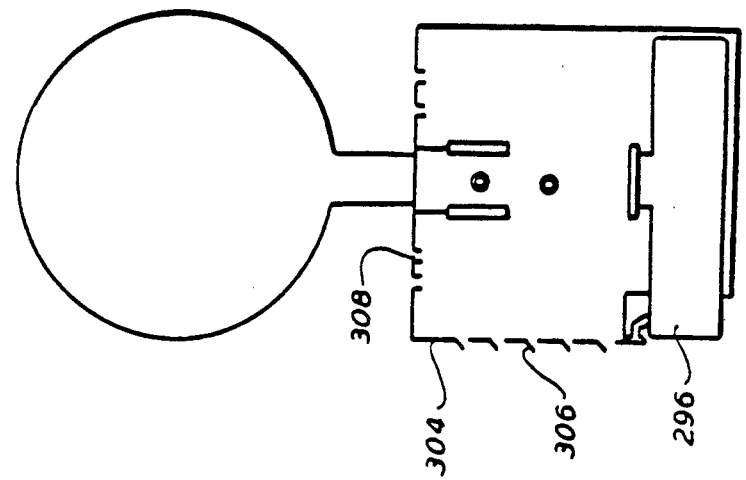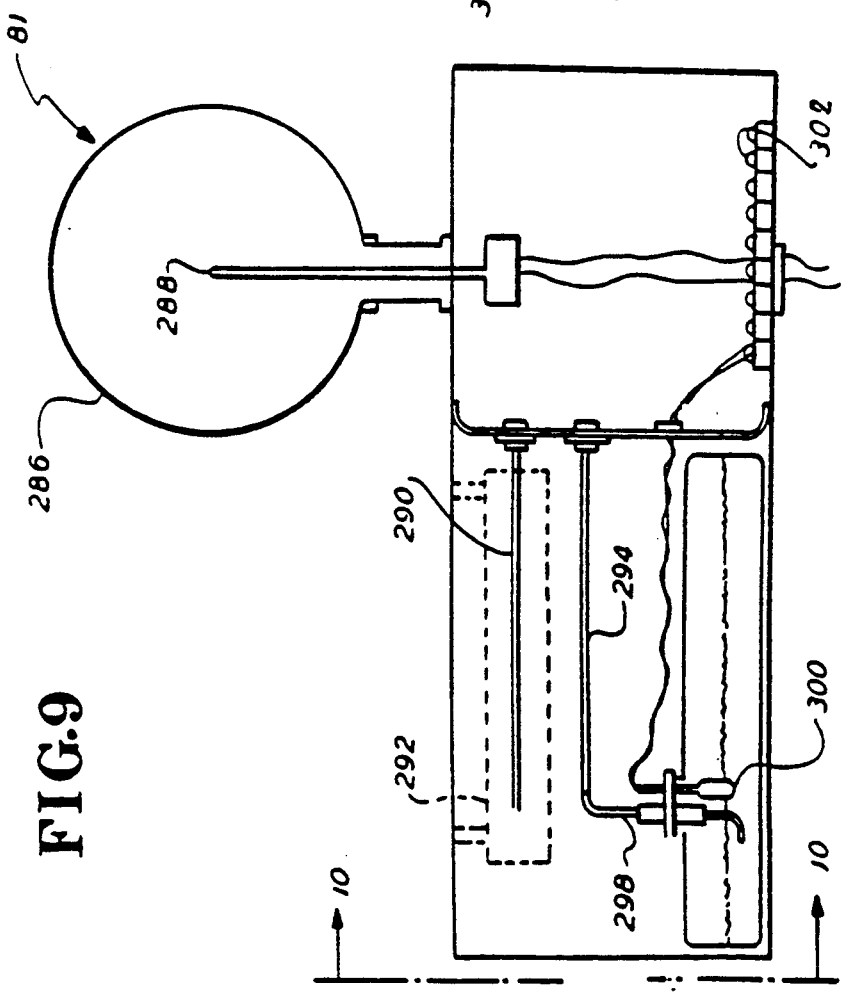

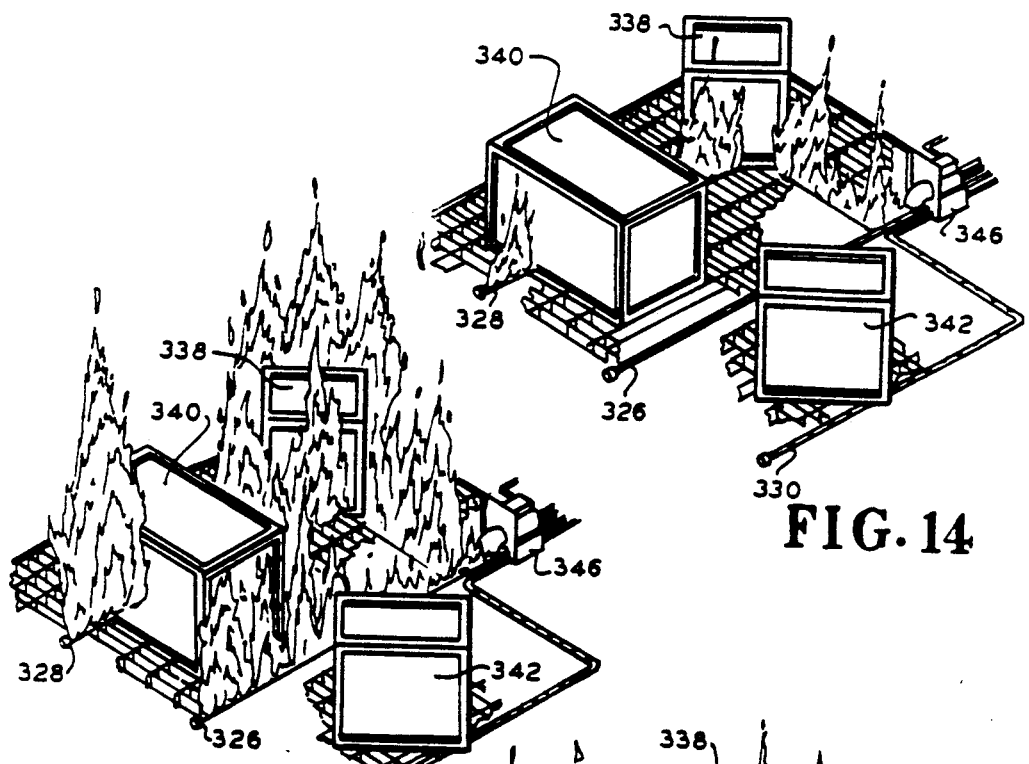
FIG. 14
FIG. 15
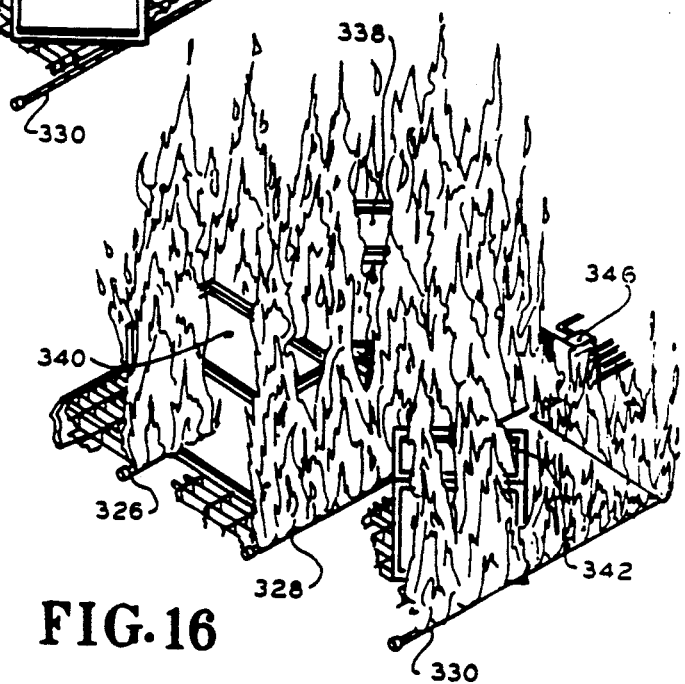
FIG. 16

FIRE FIGHTING TRAINER AND APPARATUS INCLUDING A WATER SENSOR

This application is a continuation of application Ser. No. 625,210, filed Dec. 10, 1990 now abandoned.

This application is a continuation-in-part application of application Ser. No. 387,348, filed Aug. 9, 1989 which issued as U.S. Pat. No. 4,983,124 on Jan. 8, 1991 and which in turn was a continuation-in-part of Ser. No. 238,453, filed Aug. 30, 1988 which issued as U.S. Pat. No. 4,861,270 on Aug. 29, 1989.

The invention relates to a fire fighting trainer, and in particular the invention relates to a fire fighting trainer having single- and multi-element, flame generation burner units, and having a multi-sensor unit, a smoke generator and a control and recording apparatus.

BACKGROUND OF THE INVENTION

The prior art fire fighting trainer is described in U.S. Pat. No. 4,526,548, issued Jul. 2, 1985. Related patents include U.S. Pat. Nos. 3,071,872, issued Jan. 8, 1963; 3,156,908, issued Nov. 10, 1964; 3,451,147, issued Jun. 24, 1969; 3,675,342, issued Jul. 11, 1972; 3,675,343, issued Jul. 11, 1972, and 4,001,949, issued Jan. 11, 1977 and 4,303,396 issued Dec. 1, 1981.

Other related patents include U.S. Pat. Nos. 4,526,548, issued Jul. 2, 1985; 4,303,396, issued Dec. 1, 1981; 3,071,872, issued January 1983; 3,156,908, issued November 1964; 3,451,147, issued June 1969; 3,675,342, issued July 1972; 3,675,343, issued July 1972; 4,001,949, issued January 1977; 4,299,579, issued Nov. 10, 1981; and 4,303,397, issued Dec. 1, 1981.

The prior art fire fighting trainer includes a plurality of chambers having respective contents including items chosen from a group of items including furniture and fixtures and equipment, a smoke generating system having a plurality of outlets disposed in the respective chambers, and a flame generating system having a plurality of outlets disposed in the respective chambers, and a control and monitoring system.

One problem with the prior art fire fighting trainer is that there is no way to determine which ones of the extinguishment agents are being used by the fire fighters simultaneously with the testing of the fire fighters.

Another problem is that the trainer is not adapted to simulate a spreading fire. In addition, the commercial gas burners used to produce the flames allow an unacceptable build up of unburned gas when the flames are suppressed with water application.

A third problem is inefficiency of production and distribution of the simulated smoke that is used for safety and to eliminate pollutants.

SUMMARY OF THE INVENTION

According to the present invention, a fire fighting trainer is provided. This trainer comprises a plurality of chambers having respective floors with gratings and with spaces below the gratings and having contents including items chosen from a group of items including furniture and fixtures and equipment and disposed on the gratings, a smoke generating system having plurality of outlets disposed in the respective chambers, a flame generating system having one or more single-element or multi-element burner units with elements and outlets disposed in the respective spaces of the chambers, and a sensing and control system having a plurality of multi-sensor units disposed in the shares of the respective chambers under the respective elements and each multi-sensor unit connecting to a main control panel.

By using the sensing system having a plurality of sensors disposed in the respective chambers and connecting to control panel, the problem of not being able to determine which ones of the materials are being used by the fire fighters simultaneously with the testing of the fire fighters is avoided. By using floors with spaces and gratings and multi-element burner units in the spaces, the problem of not being able to simulate a spreading fire is avoided.

By using the single-element and multi-element burners, the problem of build up of unburned gas within the training area is avoided. By using the particular smoke generation system described herein the problem of inefficiency of production and distribution of smoke is avoided.

The foregoing and other objects, features and the advantages of the invention will be apparent from the following description of the preferred embodiment of the invention as illustrated in the accompanying drawings.

BRIEF DESCRIPTION OF THE DRAWINGS

FIG. 2 is an enlarged perspective view of a portion of FIG. 1;

FIG. 3 is an enlarged perspective view of a portion of FIG. 1;

FIG. 7 is an enlarged perspective view of a portion of FIG. 1;

FIG. 8 is an enlarged perspective view of a portion of FIG. 1;

FIG. 9 is an enlarged perspective view of a portion of FIG. 1; and

FIG. 10 is a section view as taken along the line 10—10 of FIG. 9.

FIG. 14 is a representation of a first step of a spreading fire of contents of the chamber of FIG. 11;

FIG. 15 is a representation of a second step of the spreading fire of FIG. 14;

FIG. 16 is a representation of a third step of the spreading fire of FIG. 14;

DESCRIPTION OF THE PREFERRED EMBODIMENT

Figure 1:
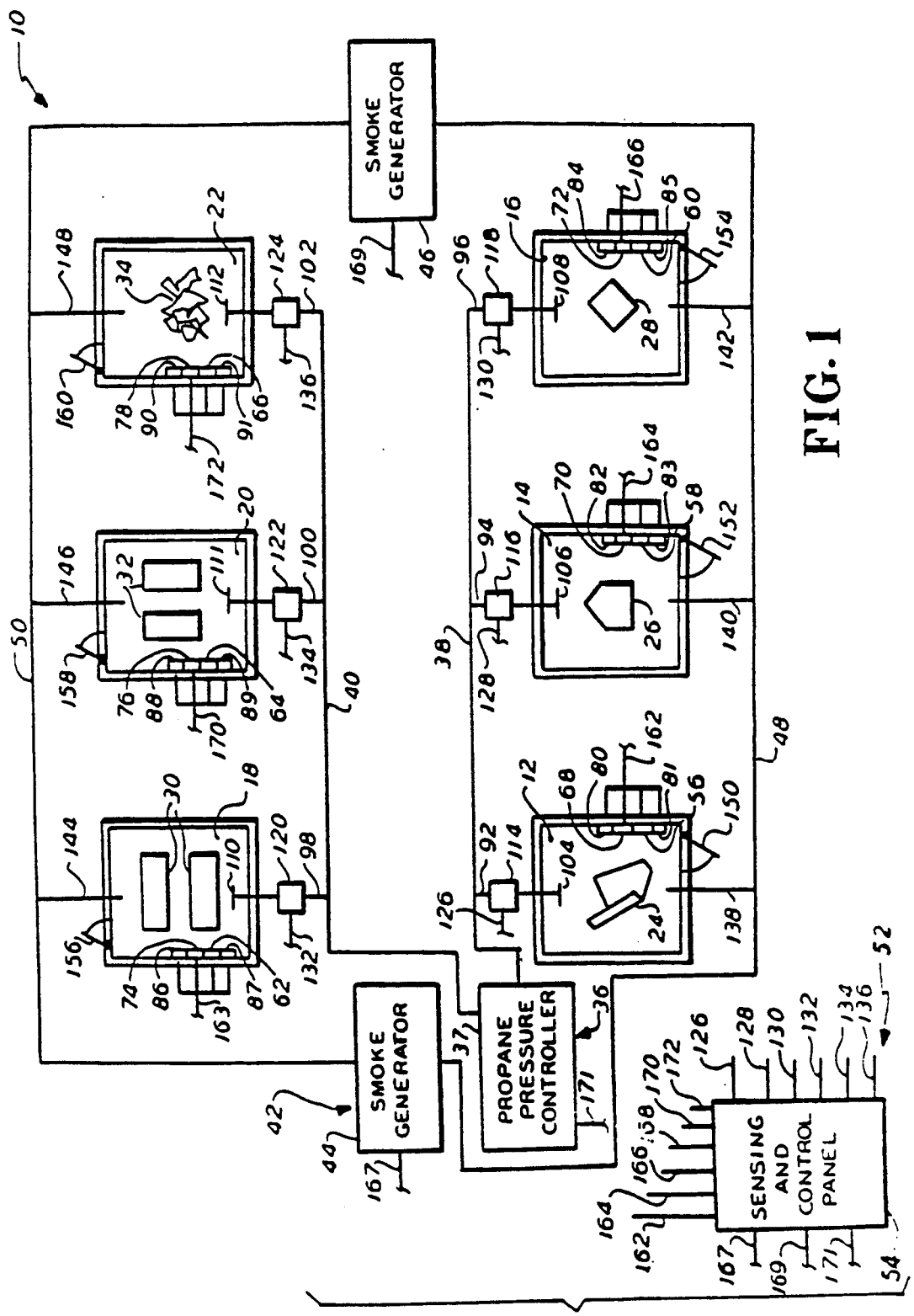
FIG. 1 is a schematic plan view of a fire fighting trainer according to the present invention.

As shown in FIG. 1, a fire fighting trainer 10 is provided. Trainer 10 includes a plurality of chambers 12, 14, 16, 18, 20, 22, which are separate chambers in a building structure, and which contain respective contents 24, 26, 28, 30, 32, 34, that are chosen from a group of items of furniture and fixtures and equipment, which are fireplace structures made of fireproof materials, such as steel, in the shape of the represented combustible material or location of the represented fire. Although FIG. 1 shows six chambers, any number of chambers, including one chamber, could be included in a given trainer.

For example, chambers 12, 14 have representations 24,26 of items such as wood items, that require water to extinguish a fire therein. Chambers 16, 18 have representations 28,30 of items, such as electrical equipment items, that require dry powder or inert gas to extinguish a fire therein. Chambers 20, 22 have representations 32, 34 of items, such as certain liquid fuel items, that require a foam or water or dry powder to extinguish a fire therein.

Trainer 10 also has a propane gas burner system 36, which has a propane gas inlet pressure controller 37, and which has distribution piping 38 and 40. Trainer 10 also has a smoke generating system 42, which has a left smoke generator 44, a right smoke generator 46, and smoke conduit 48 and smoke conduit 50. Systems 36 and 42 generate flames and smoke within selected ones of, or all of, the chambers 12, 14, 16, 18, 20, 22.

Trainer 10 also has a sensing and control system 52, which has a control panel 54. Trainer 10 includes water sensors 56, 58, 60, 62, 64, 66, and includes foam sensors 68, 70, 72, 74, 76, 78, and includes powder sensors 80, 82, 84, 86, 88, 90, and includes temperature sensors 81, 83, 85, 87, 89, 91, each of which are disposed in respective chambers 12, 14, 16, 18, 20, 22.

The water sensors, and foam sensors, and powder sensor may be separate from each other, or may be part of a combined or multi agent detector 69 which will be described herein.

Propane distribution pipe 38 has propane gas lines 92, 94, 96, which connect to respective chambers 12, 14, 16. Propane distribution pipe 40 has propane gas lines 98, 100, 102, which connect to respective chambers 18, 20, 22.

Gas lines 92, 94, 96 connect to respective burners 104, 106, 108, which are disposed inside respective chambers 12, 14, 16. Gas lines 98, 100, 102 connect to respective burners 110, 111, 112, which are disposed inside respective chambers 18, 20, 22.

Burners 104, 106, 108 which are shown near the bottom of FIG. 1 have respective control units 114, 116, 118. Burners 110, 111, 112 which are shown near the top of FIG. 1 have respective control units 120, 122, 124.

Control units 114, 116, 118 have respective electrical signal and power conductors 126, 128, 130, which connect to panel 54. Control units 120, 122, 124 have respective electrical signal and power conductors 132, 134, 136, which connect to panel 54.

Smoke conduit 48 has smoke lines 138, 140, 142, which connect to respective chambers 12, 14, 16. Smoke conduit 50 has smoke lines 144, 146, 148, which connect to respective chambers 18, 20, 22.

Chambers 12, 14, 16, 18, 20, 22 have respective doors 150, 152, 154, 156, 158, 160.

Control panel 54 has cables 162, 164, 166, which go to respective chambers 12, 14, 16. Control panel 54 also has cables 168, 170, 172, which go to respective chambers 18, 20, 22. Each of the cables 162, 164, 166, 168, 170, 172 has several conductors. For example, cable 162 has several conductors, including a first conductor connecting to water sensor 56, a second conductor connecting to foam sensor 68, a third conductor connecting to powder sensor 80, and a fourth conductor connecting to temperature sensor 81.

Each of the chambers 12, 14, 16, 18, 20, 22, stores or contains a different item or items, so that each chamber has a different type of fire, thereby requiring a different medium to put out the fire in each chamber. The water sensor 56, foam sensor 68, and powder sensor 80 in chamber 12 detects three different extinguishing materials or mediums or agents, which are reported to the control panel 54. Control panel 54 can be operated to regulate the amount of fire and smoke in typical chamber 12, or to shut off the fire and smoke in chamber 12. Control panel 54 can also be used to record the results of the actions of the trainees in chamber 12. Some items in the chambers require two or more combination extinguishing agents, such as water and foam, to extinguish the fire.

A principal feature of the trainer is the design of the burners used to generate flame for the training exercises. Commercial burners, which are designed for efficient heating of materials in industrial processes, are completely unsuitable for use in a fire fighting trainer. The trainer requires a burner that can produce a realistic fire-type flame safely and reliably even when inundated with water or foam or other extinguishing agent.

In FIG. 2, burner 104 is shown. Burner 104 is similar in construction to burners 106, 108, 110, 111, 112. Burner 104 is suitable to simulate a relatively small fire. As explained hereafter, an alternate burner can be used for simulating a relatively large, spreading fire.

In FIG. 3, burner control assembly 114 is shown. Burner control assembly 114 is similar in construction to burner control assemblies 116, 118, 120, 122, 124. Burner control assembly 114 includes a supply gas inlet 186, pilot gas components 188, main gas components 190, an air inlet filter 192, and one or more motor controlled gas valves 194. Burner control assembly also includes a pilot blower 196, a flame safeguard unit 198, and an ignition transformer unit 200.

In FIG. 3, gas enters supply line 92. A solenoid-operated shutoff valve 175 in line 92 controls the flow of gas to the pilot gas line 177 and to the main gas line 176. The pilot system includes components 188, blower 196 and pilot gas/air mixture line 178 to deliver a proper mixture of propane and air to the burner head 174. The main gas system includes supply line 92, components 190, one or more gas flow control valves 194, and one or more main lines 176 to deliver propane gas to one or more burner elements 180.

Burner head member 174 mounts within or below the fireplace structure, or the like. The shape and configuration and materials of burner head 174 are such as to provide for reliable operation of pilot and main flames when subject to any of the various extinguishing agents.

Pilot gas components 188 include a pressure regulator, a pilot gas metering valve, and a solenoid-operated pilot gas valve. The flame safeguard or pilot monitor unit 198 is an automatic self-check unit that continuously monitors the pilot flame and if the pilot flame is lost for any reason, the flame safeguard unit shuts off all gas flow to the burner. Main gas components 190 include a pressure regulator, safety solenoid valve that is controlled by the flame safeguard unit, and a solenoid-operated main gas valve.

Burner element 180 is enclosed in a fireplace (not shown), which is disposed behind real or simulated items, such as electrical or electronic consoles, or below a mattress or the like, or behind a trash can or a kitchen stove, or a sofa or the like. One or more elements may be utilized for each burner.

In FIG. 2, burner element 180 contains drilled holes configured to satisfy a flame location. One or more elements may be utilized. The holes are about one-quarter inch in size, or other size as required, and serve as gas nozzles. When main gas is introduced to element 180, it is ignited by the pilot and produces a flame appearance as desired. Cover plates 182, 184 prevent materials from falling into the holes in element 180.

A second principal feature of the trainer is the smoke generator 44. Unlike previous smoke generators, this smoke generator must produce a large volume of simulated smoke, and distribute is to various training compartments or chambers, and produce and distribute the smoke efficiently with little or no residue or pollutants.

Figure 4:
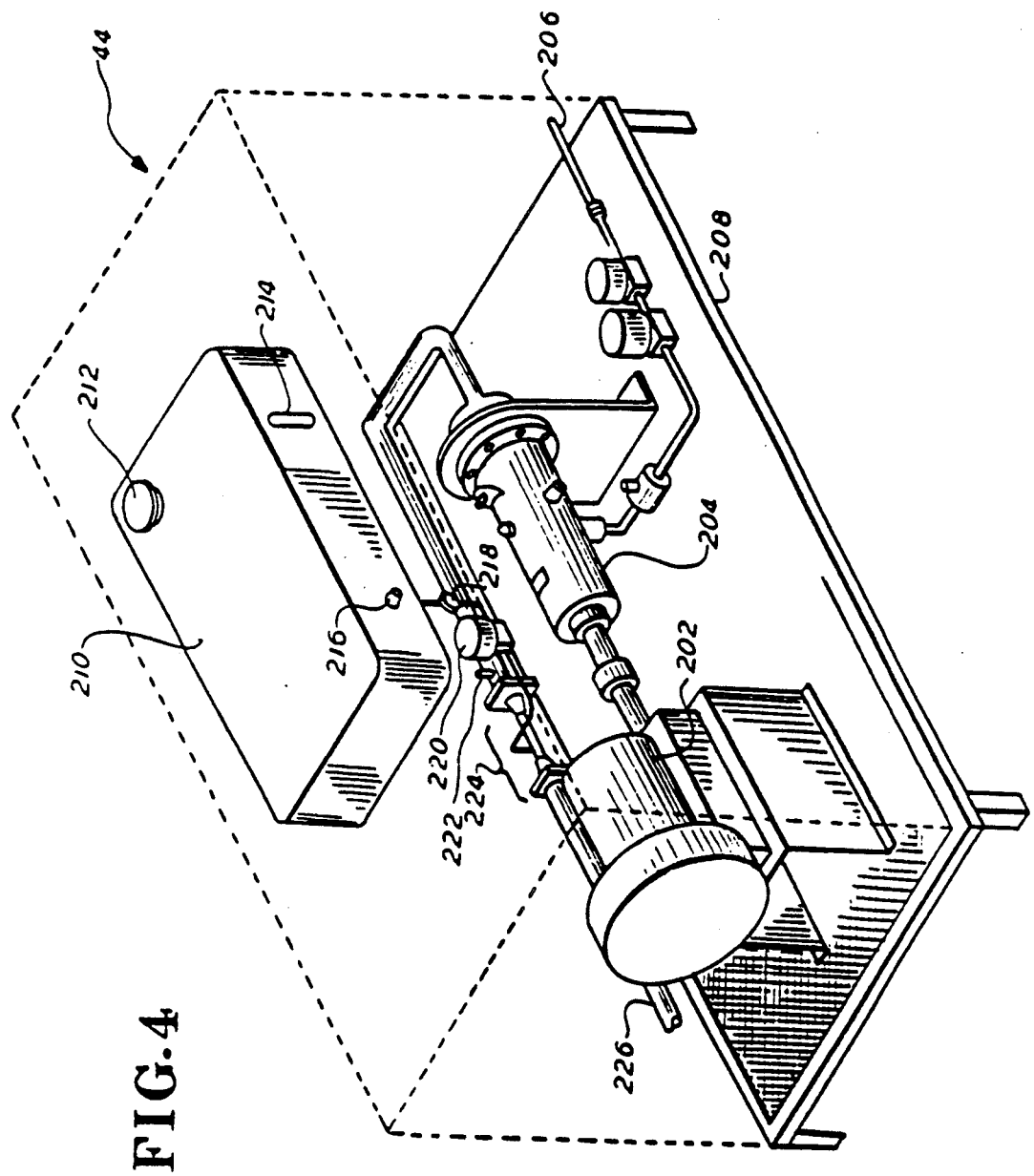
FIG. 4 is an enlarged perspective view of a portion of FIG. 1.
Figure 5:
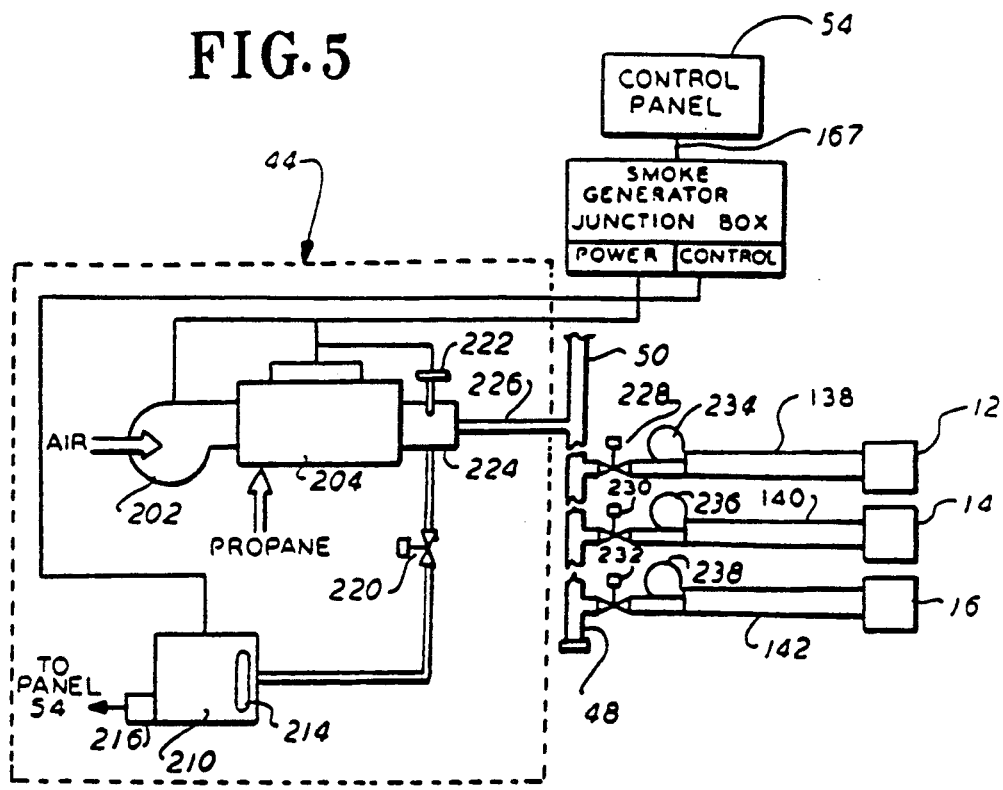
FIG. 5 is a schematic diagram corresponding to a portion of FIG. 1.

In FIG. 4, smoke generator 44 is shown. Smoke generator 44 is similar in construction to smoke generator 46. Smoke generator 44 includes an air blower 202, an air heater 204, a propane line 206, and an enclosure 208. Smoke generator 44 also includes a smoke reservoir 210, which has a cap 212, a sight glass 214, and a level switch 216. Fluid reservoir 210 has a line with a metering valve 218 and a solenoid valve 220. Air heater 204 is connected by a line with a temperature monitor 222 to an injector nozzle 224. Injector nozzle 224 has an outlet line 226. In FIG. 5, outlet line 226 connects to conduits 48 and 50.

Conduit 48 is supplied usually by smoke generator 44. Conduit 50 is supplied usually by smoke generator 46. Additional valves (not shown) in conduits 48 and 50 are provided to use such smoke supply arrangement, or to change such smoke supply arrangement as desired. Conduit 48 has solenoid valves 228, 230, 232, which connect to respective smoke lines 138, 140, 142 to respective chambers 12, 14, 16. Excess air blowers 234, 236, 238, which add cooling air to the respective smoke distribution lines, 138, 140, 142 are also provided. Panel 54 controls valves 228, 230, 232 and controls blowers 234. 236, 238.

Injector nozzle 224 is used to inject a fine mist of smoke fluid of selected content into a hot air stream produced by air heater 204. High velocity air in injector nozzle 224 vaporizes the smoke fluid. With the added cooling air produced by the excess air blowers sufficient simulated smoke is delivered to the chambers in this way.

Outlets of smoke lines 138, 140, 142, 144, 146, 148, which are disposed inside respective chambers 12, 14, 16, 18, 20, 22, Connect to respective fireplaces (not shown), which are in the form of selected fixtures, furniture or equipment, as desired. Typical burner element 180 and typical smoke line 138 connect to the same fireplace, in order to simulate a fire at the fireplace. The fireplace is defined to mean a common assembly area for training in extinguishment of a particular fire, and not a residential type of fireplace. Smoke generator 44 produces simulated smoke to chambers 12, 14, 16. Smoke generator 46 produces simulated smoke to chambers 18, 20, 22. Shutoff valves (not shown) in conduits 48 and 50 can redistribute smoke to chambers as desired.

The smoke generating system 42 is necessary because the propane gas system 36 produces virtually no smoke. The propane in burners 104, 106, 108, 110, 112, 114 is burned without additional combustion air to produce a large, yellow-orange flame. The burners specifically use propane gas to achieve realistic fl-me appearance and response to agent application.

A third principal feature of the trainer is the combined agent, or multi-agent detector. Previous detectors, each designed to detect one extinguishing agent, were unable to distinguish among agents applied. A water sensor in a funnel also detected foam, and a carbon dioxide sensor also detected water. By combining two or more sensors into a single detector using mechanical separators and programming logic: as described herein, the detector senses each extinguishing agent u-ambiguously.

Each of the chambers 12, 14, 16, 18, 20, 22 has a different type of fire, and has a respective detector assembly, which can sense and can report to control panel 54, if water, foam, powder, or inert gas is being applied to the fire. If the correct application is made, the fire is extinguished. The control panel 54 is operated to control each of the burners 104, 106, 108, 110, 111, 112, which are located in respective chambers 12, 14, 16, 18, 20, 22, in accordance with the intensity of the fire therein.

The operator of the control panel 54 can know which of the materials, such as water, foam, or powder, is being used in each chamber by the fire fighters, simultaneously with the testing of the fire fighters. In this way, the operator can regulate the intensities of the fires in the chambers, or can shut off the fires and smoke inflow, if necessary, by regulating the smoke generating system 42 and the fire generating or system 36 from the control panel 54. The control system 52 monitors conditions within the trainer and is used to automatically shut the trainer down if safety is jeopardized. Control panel 54 can have a computer, in order to provide a scenario in the testing program. A menu of selections can be used in the software of the computer. The trainer is under the control of the instructor and exercises can be repeated or changed at the control panel.

Figure 6:
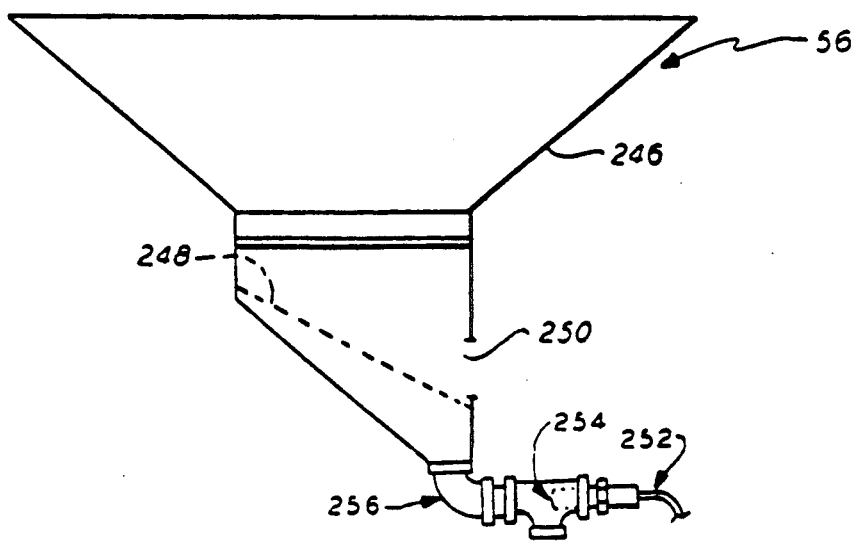
FIG. 6 is an enlarged perspective view of a portion of FIG. 1.

In FIG. 6, water sensor 56 is shown. Sensor 56 is similar in construction to sensors 58, 60, 62, 64, 66. Water sensor 56 includes a collection funnel 246, a screen 248, an opening 250, and a magneto strictive or other fluid sensor unit 252, which has a face 254 that protrudes into a pipe 256.

Sensor unit 252 is located in the neck of the collection funnel pipe 256. Funnel 246 is shaped as required to fit within or below or behind an item, such as a fixture or a fireplace structure or grating or the like. Sensor unit 252 is located at the water drain of pipe 256, thereby preventing the formation of puddles or the buildup of material on the face 254 of unit 252.

In FIG. 7, a multi-aqent detector generally indicated at 68, is shown which is an alternative from that shown in FIG. 6. Detector 68 is capable of detecting and distinguishing between water, foam and powder. Detector 68 includes a collection funnel 258, an upper powder sensor unit 260, an infrared source 261, an infrared detector 262, and a foam and water separator 264. Detector 68 also includes an upper shield 266, a magnetostrictive, or other proximity type, water sensor 268, a water exhaust opening 270, and a foam exhaust chute 272. Detector 68 also has a lower through beam foam sensor unit 274 and a lower shield 276.

Detector 68 separates the foam from the water, both of which enter through funnel 258. Funnel 258 is shaped to fit below or behind an item, such as a fixture or fireplace structure or grating. Separator 264 separates the water from the foam. Water passes to outlet 270. Foam passes to foam chute 272. Foam sensor unit 274 is a commercially available unit. Water sensor unit 268 and foam sensor unit 274 respond to their particular agent or material.

Sensor unit 274 has a sonic beam, the breaking of which causes a contact closure upon passage of foam, thereby detecting the presence of foam as the extinguishing agent.

Sensor 68 functions as described for the foam sensor portion of the combined agent detector, and is used where only foam detection is required. Sensor 68 is identical to sensors 70, 72, 74, 76 and 78.

In FIG. 8, a powder sensor 80 is shown. Powder sensor 80 is identical in construction to powder sensors 82, 84, 86, 88, 90. Powder sensor 80 includes a collection funnel 278, an infrared source 280, a pair of shields 282, and a detector 284. In this figure the sensor is shown in an alternate position. Sensor unit source 280 and detector 284 detect powder by detecting the powder cloud that breaks the light beam passing therebetween. Source 280 and detector 284 detect a powder cloud but do not detect, or see, water or foam. The assembly of source 280 and detector 284 is a commercially available item. Funnel 278 is shaped to fit below or behind burner 104, or a fixture, or the like.

Source 280 and detector 284 have an infrared light beam, the breaking of which by a powder cloud, signals the presence of powder as the extinguishing agent.

Not shown is a carbon dioxide sensor, which consists of a thermocouple, or other temperature measuring device that measures the sudden decrease in temperature at the fire that is the result of the cooling effect of the expanding carbon dioxide gas as it is released from its extinguisher cylinder.

Two or more of these sensors are combined where required for each type of fire. For example, water and foam and powder sensors are combined for use in an oil spill fire simulation; water and powder and carbon dioxide sensors are combined for use in an electrical panel fire. In addition to the mechanical separation feature described above, the trainer's control system uses control logic to distinguish among agents. For example, the carbon dioxide sensor could react to water or carbon dioxide, but if the water sensor does not detect water, the system logic concludes that carbon dioxide is being applied.

In FIG. 9 and 10, the temperature sensor 81 is shown. Temperature sensor 81 is identical in construction to sensors 83, 85, 87, 89, 91. Temperature sensor 81 includes a blackened copper sphere 286, a globe temperature thermocouple 288, a dry-bulb temperature thermocouple 290, a baffle 292, and a wet bulb temperature thermocouple 294. Temperature sensor 81 also includes a liquid reservoir 296, which has a wick 298 and a level switch 300. Temperature sensor 81 also has a terminal board 302 and a housing 304, which has louvers 306 and a slot 308.

Temperature sensor 81 is installed in chamber 12 to insure that temperature levels never reach a dangerous level for trainees and instructors and other users. Readings are transmitted to control panel 54, where action is taken to reduce the temperature in the chamber, or to close the smoke and gas lines to the chamber. The temperature sensor 81 is preferably located near the ceiling of chamber 12.

The trainer 10 also contains a propane gas detection system, which is not shown on FIG. 1. The gas detection system consists of combustible gas analyzers, sample points located throughout the trainer where gas build ups could occur, and a draw sample system that utilizes a vacuum to draw air samples from each sample point to the corresponding analyzer. If an unacceptable level of propane is detected anywhere in the trainer, the control system shuts down all burners and smoke generation, and begins ventilation of the trainer.

Figure 11:
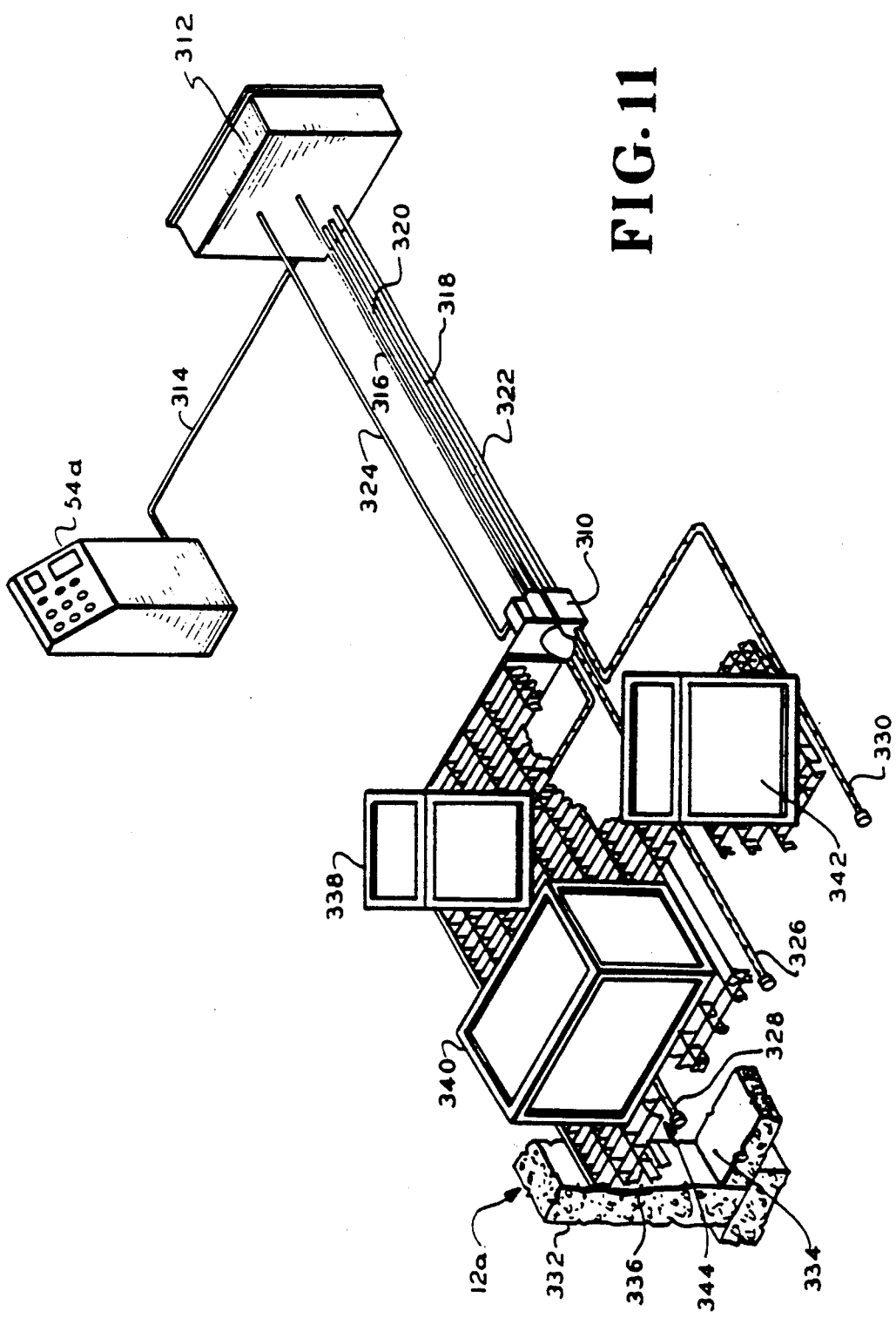
FIG. 11 is a perspective view of an alternate embodiment of the burner unit portion of FIG. 2.

As shown in FIG. 11, a second embodiment of burner unit 310 is provided. Burner 310 is similar to burner 104 of FIGS. 2 and 3, except that burner 310 is a multi-element burner unit and burner unit 104 is a single element burner unit.

Parts of burner 310 in FIG. 11 which are the same as corresponding parts of burner 104 in FIGS. 2 and 3, have the same numerals but with a subscript "a" added thereto.

Burner 310 connects to a burner control or enclosure 312, which has a control cable 314, that connects to a control panel 54a. Burner control 312 has a pilot gas line 316, a center main gas line 318, a left main gas line 320, a right main gas line 322, and an electrical conduit 324, all of which connect to burner 310. Burner 310 also has a center burner element 326, a left burner element 328, and a right burner element 330.

Chamber 12a has a peripheral wall 332 and a recessed floor slab 334. Wall 332 supports a floor grating 336 on which boxes 338, 340, 342 are supported. These boxes are made of fireproof material to resemble ordinary combustible shipping crates. Boxes 338, 340, 342, which are spaced apart are spaced near enough, so that a succeeding box appears to be heated by the flame of a preceding box, and so that a simulated spreading fire can be created. Grating 336 and slab 334 have a space 344 disposed therebetween.

The main gas lines 318, 320, 322 have respective control portions (not shown), which are disposed inside enclosure 312, and which are similar to corresponding parts of main gas line 176 of burner control 114 of FIG. 3.

Figure 12:
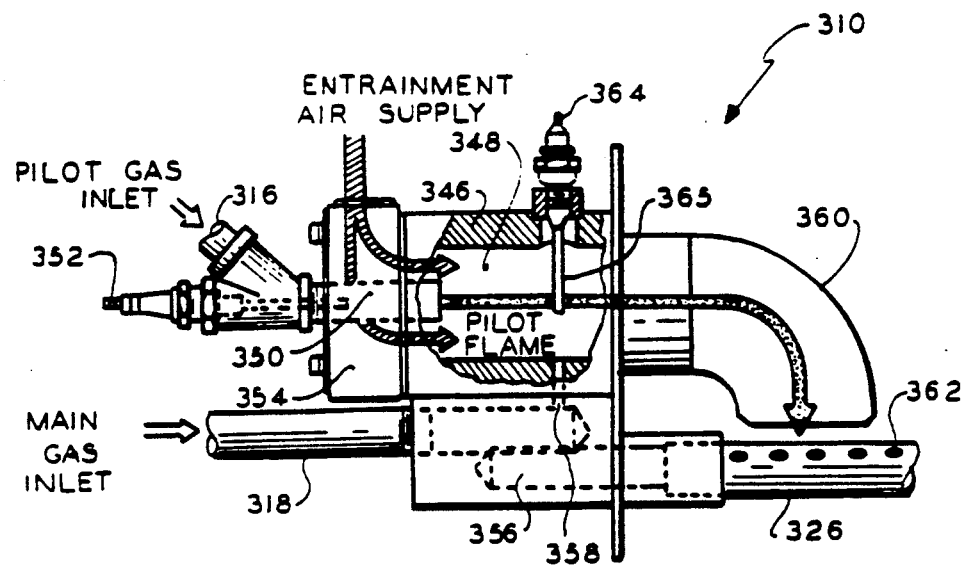
FIG. 12 is a side elevation view of the burner unit portion of FIG. 11.

As shown in FIG. 12, which is a side elevation view of burner 310, a horizontal configuration is provided. In this view, one burner element only is shown. Burner 310 includes a head member 346, which has a pilot chamber 348. Pilot gas line 316 includes a pilot nozzle 350 and a spark ignitor 352. Burner 310 also has an air entrainment plenum 354, which surrounds nozzle 350.

Gas lines 318, 320, 322 have respective main gas ports 356, which connect to elements 326, 328, 330. Pilot chamber 346 has pilot boost ports 358, which connect to gas lines 318, 320, 322, in order to increase the size of the pilot flame. Head member 346 has a pilot flame deflector 360. Elements 326, 328, 330 have respective gas distribution holes 362. The pilot monitor's flame rod 364 has its electrode 365 in the pilot flame path.

Figure 13:
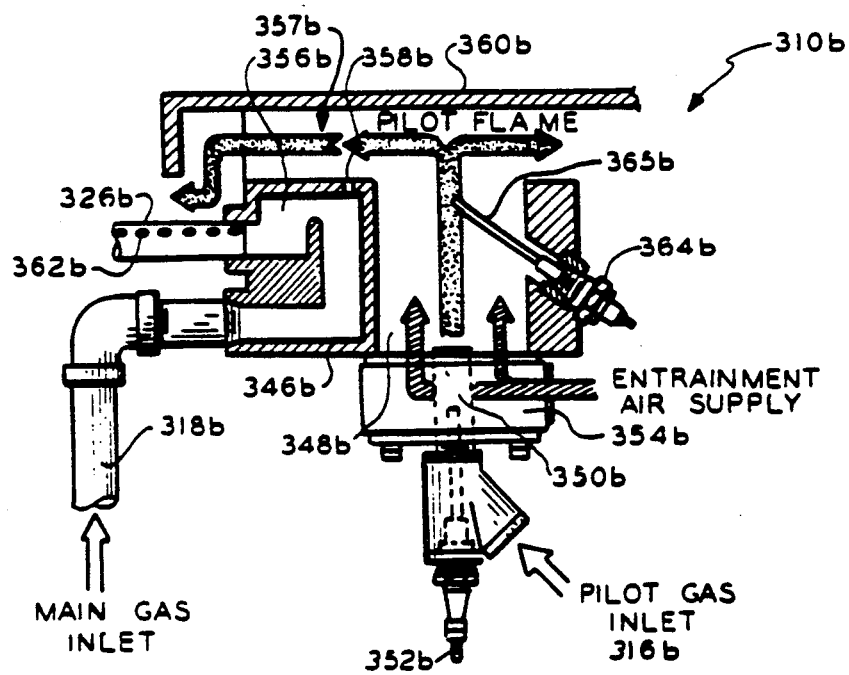
FIG. 13 is a side elevation view of an alternate embodiment of the burner unit FIGS. 11 and 12.

As shown in FIG. 13, another embodiment or burner 310b is provided. FIG. 13 shows a vertical configuration of burner 310b and shows one burner element only of a total of four, which are oriented 90 degrees apart.

Parts of burner 310b, which are similar to corresponding parts of burner 310 of FIG. 12, have the same numerals, but with a subscript "b" added thereto.

Burner 310b includes a head member 346b, with a pilot chamber 348b. Burner 310b also includes a plenum 354b, main gas ports 356b, pilot boost ports 358b, a flame deflector 360b, distribution holes 362b, and a flame rod 364b.

The pilot gas/air mixture from burner control enclosure 312 is introduced into the pilot chamber 348 via the pilot nozzle 350 where it is ignited, using, in this embodiment, a rear-mounted spark ignitor 352, which provides spark within the nozzle igniting the gas/air mixture before it exits the nozzle for pilot ignition reliability. Once ignited, pilot flame stability during extinguishing agent application is enhanced by additional air introduced into the pilot chamber 348 through the air entrainment plenum 354 surrounding the nozzle 350. The pilot flame is monitored by a commercial pilot monitor utilizing a flame rod 364 to confirm pilot flame. This is done by establishing an electric current flow between the burner head 346, and the insulated flame rod electrode 365, through the ionized gas of the pilot flame. This is necessary to ensure that there is a reliable pilot flame before main gas flow is begun.

When main gas flow to the burner head is begun, undiluted gas is introduced at the main gas inlets 318, 320, 322, through the burner main gas ports 356, to the burner elements 358. A small amount of undiluted gas is directed through the pilot boost ports 358 into the pilot chamber 348 to increase the size of the pilot flame over the burner elements 326,328,330 to ignite the undiluted main gas emitted through the burner element gas distribution holes 362. The configuration of the pilot flame deflector 360 and the location and shape of the burner main gas ports 356 and pilot boost ports 358 assures ignition of main gas by the pilot flame. In the case of the vertical orientation of the multi-element burner shown in FIG. 13, four individual pilot flame expansion channels 357b, are provided to direct pilot flame from the central pilot chamber 348b to each of the four flame elements 326b. In addition, the offset internal path of the main gas ports 356 prevents water or foam that may have entered a burner element 326,328,330 through its gas distribution holes 362 when main gas flow is off from flowing back up the gas piping system. There is a separate main gas inlet line 318,320,322 for each main gas port 356 in the burner head 346.

FIGS. 14, 15 and 16 show the effect achieved with the multiple-element burner. In FIG. 14, pilot flame has been confirmed, and gas flow is started to burner element 328 at one side of the storage area mockup 338, 340, 342 representing the start of the fire. In FIG. 15, gas flow is started to the 16 burner element 326 as gas flow to the element 328 approaches maximum. In FIG. 16, gas flow is started to the burner element 330, as the elements 326, 328 are at high fire. The result is the effect of a fire starting, spreading and growing until the entire storage area mockup 338, 340, 342 is engulfed in flames.

In operations, the burner control enclosure 312 receives control signals from the operator's console or panel 54a. The enclosure 312 begins flow of a proper pilot gas/air mixture to the pilot chamber 348 of the burner head 346. This mixture is ignited by a spark ignitor 352 located so as to produce a spark within the pilot nozzle 350. The pilot flame is ignited before the fuel/air mixture exits the nozzle 350, eliminating unstable ignition.

Pilot stability is further enhanced by air entrainment. Additional air is provided to a plenum 354 at the rear of the pilot chamber 348. This air surrounds the nozzle 350 and pilot flame providing available combustion air to the pilot flame should changes in environmental conditions at the burner require changes in the fuel/air ratio. The pilot flame must be confirmed before main gas flow is begun. The burner system utilizes a conventional pilot monitor with a flame rod 364 which provides an interlock against starting main gas flow if there is no pilot flame.

With confirmation of pilot, main flame, which is the large yellow-orange flame associated with the training exercise, may be started. Undiluted main gas flow is now begun from the enclosure 312 through the main gas ports 356 of the burner head 346 to the burner elements 326,328,330 are connected to the burner head 346 so as to assure ignition for the undiluted main gas from the pilot flame. Pilot boost ports 358 are provided within the burner head 346 to increase the size of the pilot flame to assure that adequate pilot flame is available for main flame ignition during the extreme changes in environmental conditions at the burner 310 that occurring application of extinguishing agents to the training fire.

Undiluted main gas flow to each burner element 326,328,330 is sequentially controlled to allow the training fire to start at one point under the grated floor 336 and then grow in height and spread across the fire area until a full fire condition is reached.

Because of the design of the gas burner 310, water or other agent applied to the fire by trainees will not extinguish the flames, although the flames will be suppressed and cooled as in a real fire. The control panel 54, which is operated by the operator or instructor is used to begin sequentially reducing, and then stopping main gas flow to the burner elements 326,328,330 causing the flame to recede and extinguish.

Figure 17:
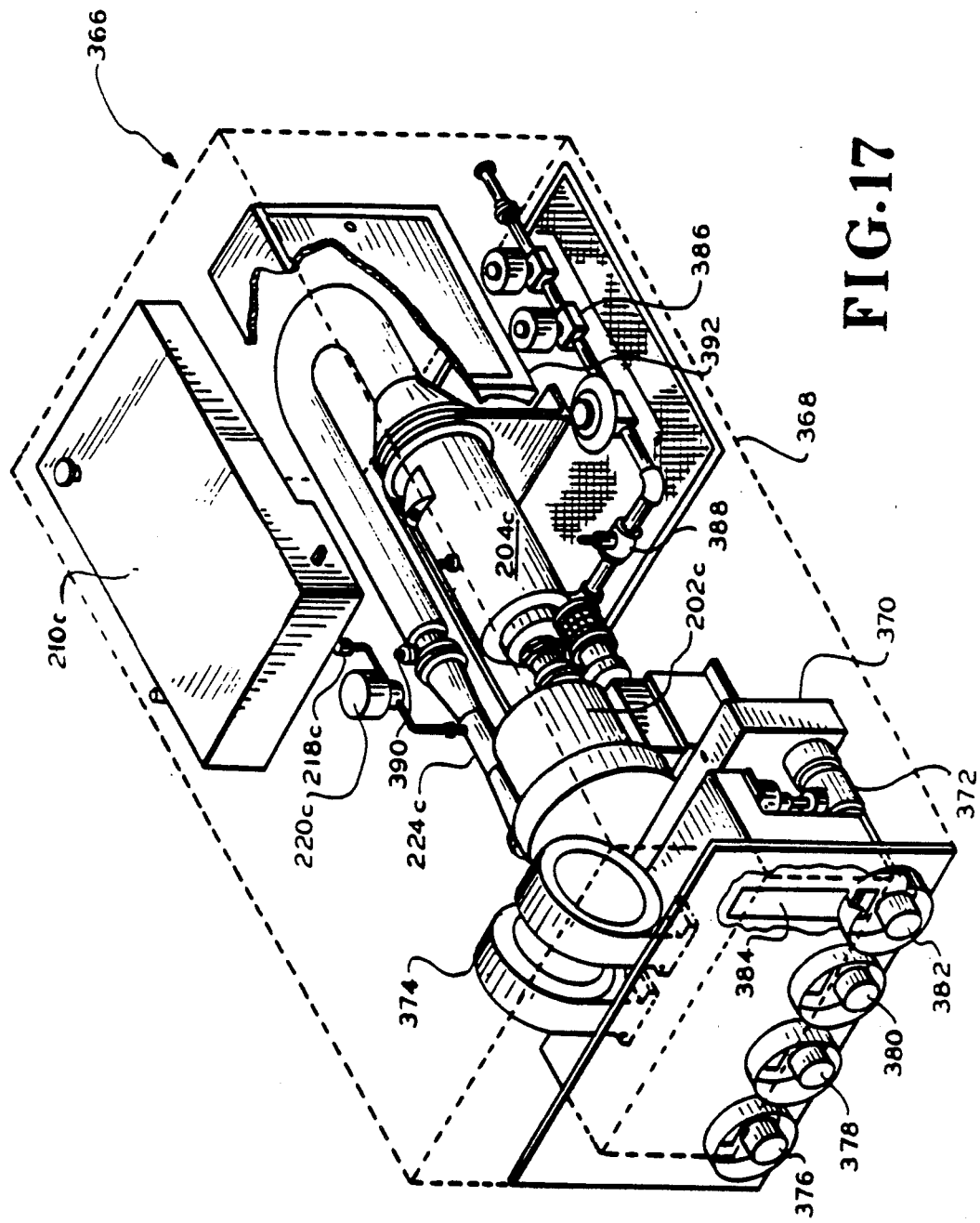
FIG. 17 is an alternate embodiment of a smoke generator corresponding to the smoke generator of FIG. 4.

As shown in FIG. 17, an alternate embodiment or smoke generator 366 is provided, corresponding to smoke generator 44 of FIG. 4.

Parts of smoke generator 366, which are similar to corresponding parts of smoke generator 44, have the same numerals but with a subscript "c" added thereto.

The smoke generator's components are contained within an enclosure 368 that is weatherproof and that provides for transportability. The volume and durability of the smoke-like fog result from the use of a high-efficiency propane air heater 204a which is fed by a high-flow combustion air blower 202c, heating the air to 1000° F.

The smoke generator is designed to use a very high quality triarylphosphate fluid with a flame—retardant characteristic that has been specifically tested for non-toxicity as a fluid and as smoke, and for chemical integrity at high temperature. This fluid is preferred. Other fluids may break down at high temperatures into toxic or flammable components, or may simply not produce good smoke. The preferred fluid is stored in a tank 210c is and metered into the hot air stream at the injection nozzle 224c where it is atomized into extremely small droplets, which will give the smoke its characteristic durability.

A balanced distribution manifold 370 provides up to four separate distribution lines each with its own control valve 372 for selecting any or all lines. An excess air blower 374 dilutes the hot air/fluid mist which is clear cooling it to below 200° F and now causing it to appear as a dense smoke-like fog. This principle feature allows the smoke to be distributed as a stable fog at cool temperatures rather than as an unstable hot mist in which much more of the droplets settle out within the distribution piping and on training room walls as with previous smoke generator designs. Piping is connected to the smoke outlet ports 376, 378, 380, 382 to distribute the smoke-like fog to several training compartments or to specific mock-up structures, such as of electrical devices that would produce smoke if on fire. Adjustable baffles 384 are provided at each port to limit smoke out put for that port if needed.

Other components include the propane control valves and regulator 386 the propane flow needle valve 388, which is used to set operating temperature, the air temperature monitor 390, the fluid metering valve 218c, which sets fluid flow, the fluid solenoid valve 220c, which turns fluid flow, and therefore smoke, on and off, and the electrical panel 392, which contains the electronics for ignition and monitoring of the heater flame, and air temperature monitoring, and is the connection point for wiring and cables to the system control panel or console.

Figure 18:
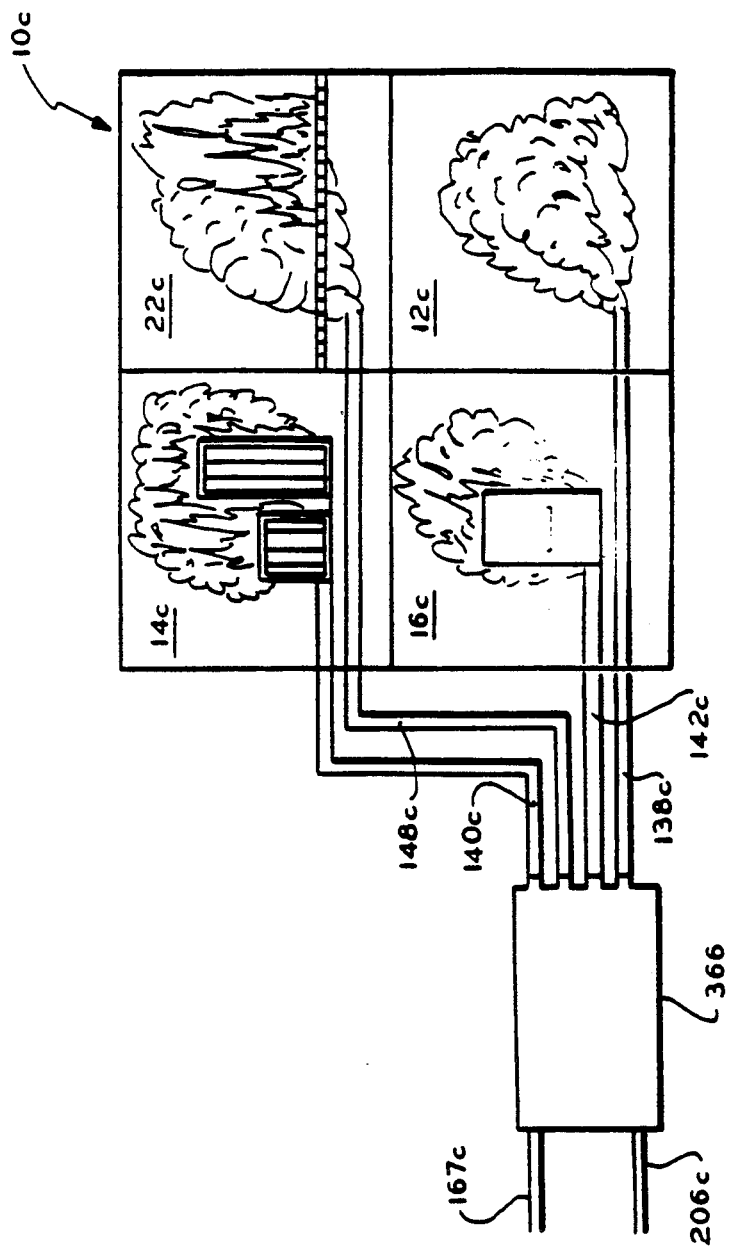
FIG. 18 is a schematic representation of the smoke generator of FIG. 17 and its connecting units.

FIG. 18 illustrates an alternate configuration of a trainer 10c with a smoke generator 366. Control signal wires 167c convey signal information from the control panel 54c to start and run the smoke generator 366. Smoke distribution piping 138c, 140c, 142c, 148c distributes the smoke to four training chambers 12c, 14c, 16c, 22c, ways the smoke is used. In chamber 14c, smoke is distributed among is distributed among fireproof mock-ups of wooden crates to simulate a Class A fire (dry combustible material). Smoke in chamber 22c is distributed under a grated floor along with a large volume of flame to simulate a Class B fire (burning liquid fuel) in a ship's bilge. A small amount of smoke in chamber 16c is distributed to a fireproof mockup of an electrical panel to simulate a Class C (electrical) fire. Smoke in chamber 22c is distributed throughout the compartment for obscuration training without fire.

Figure 19:
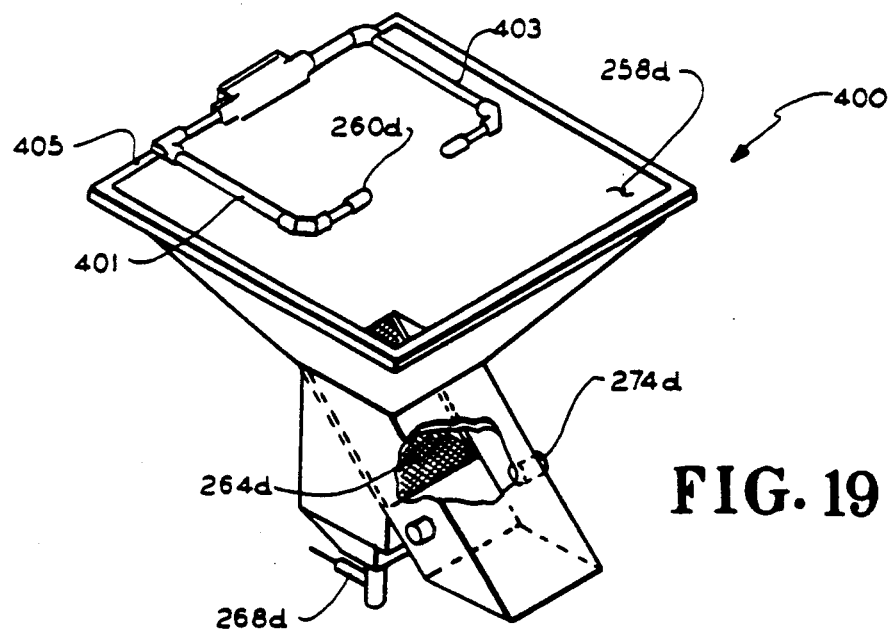
FIG. 19 is an alternate embodiment of the multi-sensor unit of FIG. 7.

As shown in FIG. 19, a second embodiment or multi-sensor unit 400 is provided, which corresponds to multi-sensor unit 68 of FIG. 7.

Parts of unit 400 similar to corresponding parts of unit 68 of FIG. 7 have the same numerals but with a subscript "d" added thereto.

FIG. 19 shows the alternate embodiment of a multi-sensor unit 400. The major components include the agent collection funnel 258d, which is sized to meet the coverage requirements of the particular fire it will be used with, the water/foam separator 264d, which is attached to the bottom of the funnel and contains a screen that separates foam from water if both are used and shunts the foam to a foam detector trough on the side while allowing the water to fall straight through, the water sensor 268d, which is a magnetostrictive cell or other proximity device mounted within the water drain line at the bottom of the assembly, and provides an electronic signal when water passes through it, a foam sensor 274d, which is an ultrasonic sender/receiver, that will be sensitive to foam interrupting the signal path, mounted in the foam detector trough and provides an electronic signal when foam passes through it, and a powder sensor 260d, which is an infrared sensor/receiver unit mounted on the top rim of the funnel, and provides an electronic signal when powder between the sensor probes. Powder sensor 260d has two arms 401, 403 which are cantilevered from a rim 405 of funnel 258d.

Figure 20:
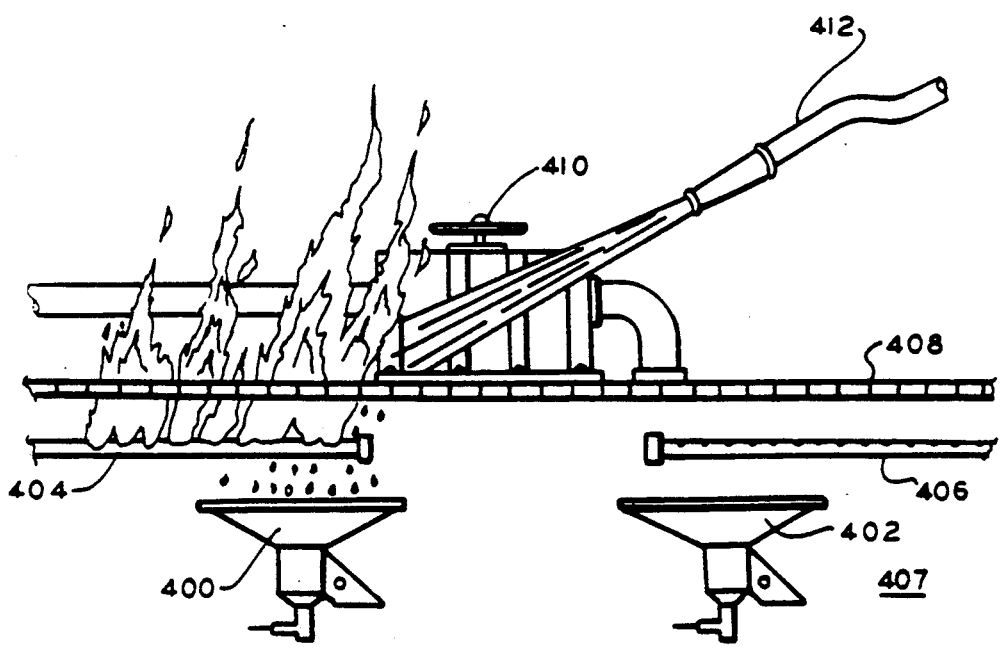
FIG. 20 is a section view of a chamber having a plurality of the multi-sensor units of FIG. 19.

FIG. 20 shows an alternate chamber configuration, in this case for training for a fire located in the bilge area of a commercial or naval vessel. The major components in the chamber are the multi-sensor units 400, 402 that are installed in the space 407 below a grated metal deck 403, under the burner elements 404, 406 that produce the flames for the training fire. Mounted on the grated deck are mockup structures 410 of bilge compartment components such as pumps, valves, piping, etc.

When extinguishing agents are applied from a hose 412 to the flames by the trainees, the agents fall through the grated metal deck where they are collected and identified by the multiple-agent detectors which then provide electronic signals which convey a precise pattern of agent application to the control panel 54d so that the operator or instructor can initiate an adjustment to gas flow to the burners to effect extinguishment or other response to the fire.

The advantages of trainer 10 are indicated hereafter.

1. The sensing and control system 52 determines the material, such as water or foam or powder, which is being used by the fire fighters in each chamber, and reports such information to the control panel 54 at the same time; and the amount of flames and smoke in any chamber can be reset immediately, for better safety and teaching.

2. The sensing and control system 52 receives the information about the material used in each chamber for extinguishing the fire whereby the information can be recorded in a report on the test of the fire fighters.

3. The items 24, 26, 28, 30, 32, 34, which are stored in respective chambers 12, 14, 16, 18, 20, 22 can be house items, such as respective living room items, bedroom items, kitchen items, cellar items, attic items and office items, or can be industrial items, such as respective chemical storage items, electronic parts items, electronic console items, laboratory items, office items and file room items, or can be restaurant or hotel items, so that trainer 10 provides a test ground for different situations.

4. In a test of fire fighters, some of the chambers can be excluded or shut down, depending on the size of the test, or the selection of chambers desired, for better operating efficiency.

Advantages of the alternate embodiments of the trainer 10 are indicated hereafter.

1. Burner 310 operates effectively, when directly exposed to extinguishing water, foam, and powder, because the pilot frame, pilot ignites 352, flame rod 364 and main gas ports 356 are protected as shown in FIG. 12.

2. The appearance of a spreading fire is simulated by multiple main gas ports 356 and multiple burner elements 326, 328, 330 as shown in FIGS. 11 and 12.

3. Vertically oriented burner 310, as shown in FIG. 12, is very suitable for large, open area fires, such as bilge or deck fires.

4. Horizontally oriented burner 310b, as shown in FIG. 13, is very suitable for relatively smaller, single burner fires, such as trash can, mattress, or electrical panel fires.

5. Burner elements 326, 328, 330 avoids a hazardous gas build up condition in a chamber, and minimizes the escape of unburned gas therefrom, because the elements 326, 328, 330 are located in a well ventilated open space 344 under the grating 336 of the chamber, as shown in FIG. 11.

6. Smoke generator 366 is capable of producing relatively large amounts of smoke-like fog, which is non-toxic, from a relatively small-size type of smoke generator, as shown in FIGS. 1 and 17.

7. Smoke generator 366 has an internal header 370, which permits relatively quicker and easier distribution to individual lines from outlets 376, 378, 380, 382 to respective chamber smoke lines 138, 140, 142, 148, as shown in FIGS. 1 and 17.

8. Multi-sensor unit 400 has a rim 405 with cantilevered arms 401, 403, which support transmitter and receiver parts of powder sensor 260*d*, so that a powder cloud located somewhat above the unit 400 can be sensed effectively, as well as a powder cloud located within funnel 258*d*.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:

1. A fire fighting trainer comprising:
   one or more chambers having respective contents including items chosen from a group of items including furniture and fixtures and equipment;
   a smoke generating means having a plurality of outlets disposed in the respective chambers;
   a frame generating means having a plurality of outlets disposed in the respective chambers; and
   a sensing and control means having a plurality of sensor assemblies disposed in the respective chambers and each sensor assembly connecting to a main control panel, wherein
   each said sensor assembly includes a plurality of sensors and each said sensor is capable of sensing and reporting a particular extinguishing agent,
   recording and control means for controlling the operation of the trainer and recording the results, and
   a water sensor for use in said sensor assembly comprising:
   a collection funnel having a screen element and a first outlet opening disposed above the screen element and an outlet pipe with a second outlet opening disposed below the screen element; and a proximity sensor unit mounted on and extending into the outlet pipe above the second outlet opening wherein the proximity sensor unit has a conductor connecting to the main control panel; said screen element being within the funnel and diverts foam agent away from the water sensor to another type of sensor through an aperture in the wall; and wherein
   each flame generating outlet has a burner control having a conductor connecting to the main control panel.

2. The fire fighting trainer of claim 1 wherein said proximity sensor unit is a magnetostrictive fluid sensor unit.

* * * * *